United States Patent
Dhanapal

(10) Patent No.: US 12,024,361 B2
(45) Date of Patent: Jul. 2, 2024

(54) AIRCRAFT LAVATORY TRASH COMPACTOR

(71) Applicant: B/E Aerospace, Inc., Winston Salem, NC (US)

(72) Inventor: Manikandan Dhanapal, Rockford, IL (US)

(73) Assignee: B/E AEROSPACE, INC., Winston-Salem, NC (US)

( * ) Notice: Subject to any disclaimer, the term of this patent is extended or adjusted under 35 U.S.C. 154(b) by 0 days.

(21) Appl. No.: 17/864,165

(22) Filed: Jul. 13, 2022

(65) Prior Publication Data

US 2023/0348181 A1    Nov. 2, 2023

(30) Foreign Application Priority Data

Apr. 28, 2022 (IN) .............................. 202241025008

(51) Int. Cl.
| *B65F 1/14* | (2006.01) |
| *B30B 12/00* | (2006.01) |
| *B64D 11/00* | (2006.01) |

(52) U.S. Cl.
CPC ............ *B65F 1/1405* (2013.01); *B30B 12/00* (2013.01); *B64D 11/00* (2013.01)

(58) Field of Classification Search
CPC ... B30B 9/3007; B30B 9/3035; B30B 9/3042; B30B 9/3046; B30B 9/3096; B30B 9/3071; B30B 1/00; B30B 1/005; B30B 1/006; B30B 1/04; B30B 12/00; B30B 15/007; B30B 15/0047; B30B 15/0082; B65F 2210/1443; B65F 2210/12; B65F 2210/20; B65F 2001/1692; B65F 1/1405; B65F 1/1426; B64D 11/00; B64D 11/02; B64D 11/04

See application file for complete search history.

(56) References Cited

U.S. PATENT DOCUMENTS

| 7,874,247 | B2 | 1/2011 | Wideall |
| 10,351,337 | B2 | 7/2019 | McIntosh |
| 2014/0041535 | A1* | 2/2014 | Shearer ................ B30B 9/3064 100/229 A |
| 2016/0115681 | A1 | 4/2016 | Lassmann et al. |
| 2022/0111096 | A1 | 4/2022 | Childress |

FOREIGN PATENT DOCUMENTS

| CN | 108163422 | | 6/2018 | |
| CN | 108163422 | A * | 6/2018 | ............... B65F 1/00 |
| CN | 108328174 | A * | 7/2018 | ............... B65F 1/00 |
| EP | 1309483 | | 2/2006 | |
| KR | 102350080 | | 1/2022 | |
| WO | 2019116166 | | 6/2019 | |

OTHER PUBLICATIONS

European Patent Office, European Search Report dated Sep. 21, 2023 in Application No. 23170692.0.

* cited by examiner

*Primary Examiner* — Jimmy T Nguyen
(74) *Attorney, Agent, or Firm* — SNELL & WILMER L.L.P.

(57) ABSTRACT

An aircraft lavatory trash compactor includes a water source, a valve actuator connected to the water source, a trash can disposed below the valve actuator, and a controller configured to activate the valve actuator to spray water into the trash can.

8 Claims, 4 Drawing Sheets

AIRCRAFT LAVATORY TRASH COMPACTOR

CROSS-REFERENCE TO RELATED APPLICATIONS

This application claims priority to, and the benefit of, India Provisional Patent Application No. 202241025008, filed Apr. 28, 2022 (DAS Code 92EF) and titled "AIRCRAFT LAVATORY TRASH COMPACTOR," which is incorporated by reference herein in its entirety for all purposes.

FIELD

The present disclosure generally relates aircraft lavatory trash cans and more specifically to a trash compactor for use in an aircraft lavatory

BACKGROUND

Aircraft lavatory trash cans fill up quickly, especially on long haul flights with hundreds of passengers. Currently, to avoid this, a crew member must check each lavatory to determine whether the trash bag needs to be replaced. The crew member must then change the trash bag. This is burdensome on crew members as there is currently no indication as to whether the trash can is full. Additionally, when the trash bags are not changed, trash may overflow the trash can, causing a hygiene issue. Furthermore, passengers may hesitate to open the trash can when nearly full due to hygiene issues and instead place the trash on top or next to the trash can. This results in unsatisfied passengers and more work for crew members. There is a need to improve aircraft lavatory trash cans.

SUMMARY

An aircraft lavatory trash compactor is disclosed herein. The aircraft lavatory trash compactor includes a water source, a valve actuator connected to the water source, a trash can disposed below the valve actuator, and a controller configured to activate the valve actuator to spray water into the trash can. In various embodiments, the controller activates the valve actuator to be open for about 2 seconds to about 3 seconds. In various embodiments, the aircraft lavatory trash compactor further includes a door switch connected to the controller, wherein the controller is further configured to read the door switch to determine an occupancy of an aircraft lavatory, wherein the controller deactivates the valve actuator in response to the aircraft lavatory being occupied.

In various embodiments, the aircraft lavatory trash compactor further includes a sensor configured to read a level of trash in the trash can and an LED to indicate the level of trash in the trash can. In various embodiments, the controller is further configured to determine the level of trash in the trash can based on the sensor and update the LED based on the determined level of trash. In various embodiments, the controller is further configured to activate the valve actuator in response to the level of trash in the trash can exceeding a threshold.

In various embodiments, the water source includes a fresh water source, a used water source, and a water valve connected to the fresh water source, the used water source, and the valve actuator, the water valve including a check valve to prevent backflow of the used water source into the fresh water source.

In various embodiments, the aircraft lavatory trash compactor further includes a valve controller configured to receive an instruction from the controller and activate the valve actuator in response to receiving the instruction. In various embodiments, the aircraft lavatory trash compactor further includes a power supply configured to power the controller and the valve actuator.

Also disclosed herein is a method of controlling an aircraft lavatory trash compactor. The method includes receiving, by a processor, a signal indicating a level of trash in a trash can. The method further includes, determining, by the processor, the level of trash in the trash can in response to receiving the signal. The method further includes, determining, by the processor, that the level of trash is above a threshold. The method further includes, activating, by the processor, a water valve in response to the determination that the level of trash is above the threshold.

In various embodiments, the method further includes determining, by the processor, that an aircraft lavatory is unoccupied before activating the water valve. In various embodiments, the method further includes updating, by the processor, a sign based on the determined level of trash in the trash can.

In various embodiments, the method further includes identifying, by the processor, a source of water to use from multiple sources of water and selecting, by the processor, the determined source of water before activating the water valve. In various embodiments, the multiple sources of water include a fresh water source and a used water source.

In various embodiments, the method further includes polling, by the processor, a sensor coupled to the trash can before determining the level of trash, the sensor configured to provide the level of trash in the trash can. In various embodiments, the method further includes determining, by the processor, a second level of trash in the trash can, determining, by the processor, that the second level of trash exceeds a second threshold, the second threshold being greater than the threshold, and activating, by the processor, the water valve in response to the determination that the second level of trash is above the second threshold.

In various embodiments, the method further includes identifying, by the processor, a presence of the trash can before determining the level of trash in the trash can.

Also disclosed herein is a trash compactor. The trash compactor includes a trash can, a water head disposed above the trash can, a water source, a valve actuator coupled to the water source and to the water head, the valve actuator configured to provide water to the water head, and a controller configured to activate the valve actuator to spray water into the trash can.

In various embodiments, the trash compactor further includes a sensor connected to the trash can, the sensor configured to read a level of trash in the trash can and transmit the level of trash to the controller and a display connected to the controller, the display configured to provide an indication that the trash can is full.

In various embodiments, the trash compactor further includes a valve controller configured to receive instructions from the controller and to activate the valve actuator in response to the received instructions.

The foregoing features and elements may be combined in any combination, without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

Figure 1:
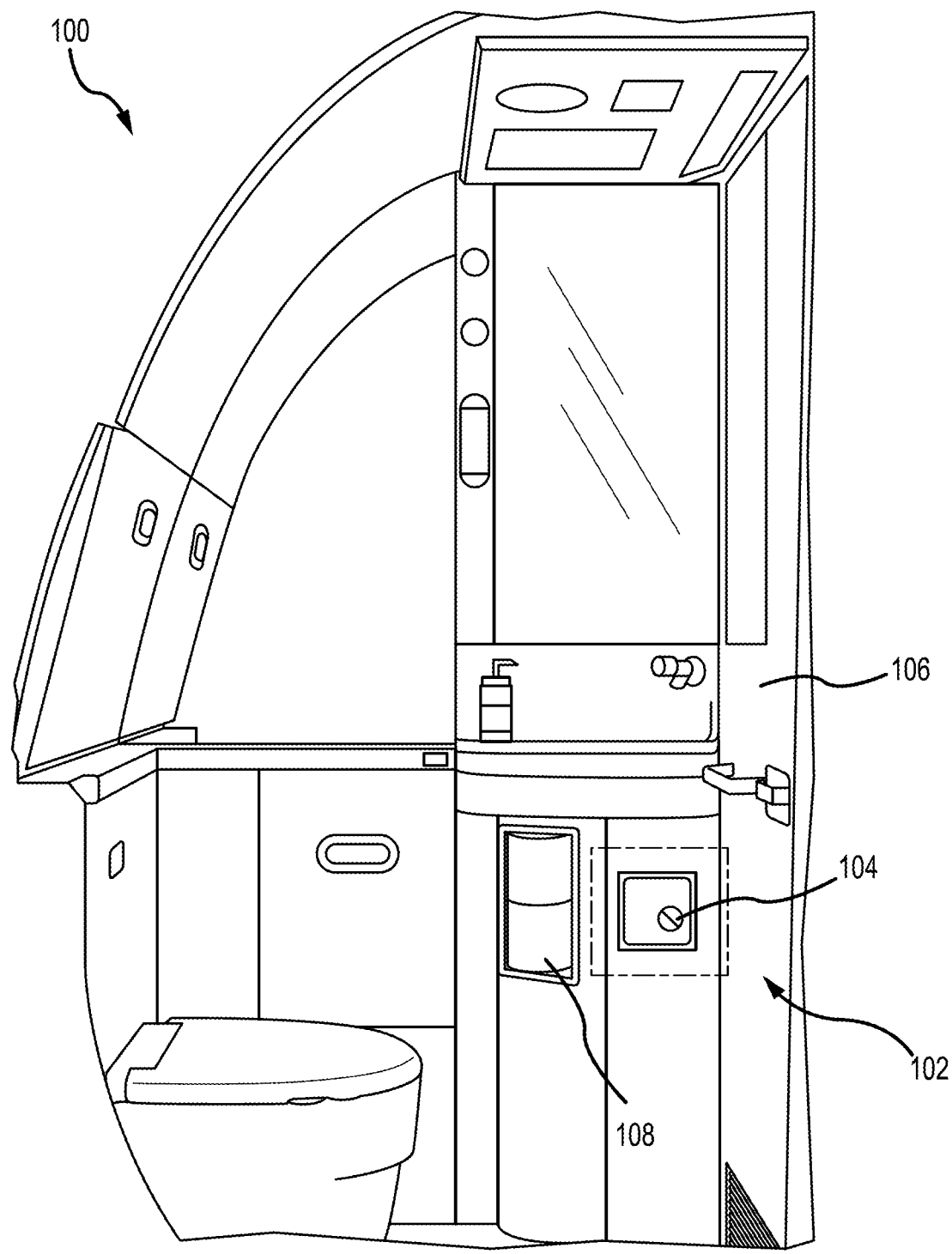
FIG. 1 illustrates an exemplary aircraft lavatory, in accordance with various embodiments.

Referring to FIG. 1, in accordance with various embodiments, an exemplary aircraft lavatory 100 is illustrated. Aircraft lavatory 100 includes a trash can 102, a trash flap 104, and a door 106. Aircraft lavatory 100 further includes wipes and/or paper towels illustrated as wipes 108. A passenger may enter aircraft lavatory 100 using door 106. The passenger may use the sink, dry their hands using wipes 108, and throw wipes 108 in trash can 102. As passengers continue to use aircraft lavatory 100, trash 102 fills with trash and is emptied periodically by crew members. The majority of trash in trash can 102 may comprise wipes 108 (e.g., wipes and/or paper towels) that are used to dry the passengers' hands. Wipes 108 in aircraft lavatories are generally water soluble for safe use in the aircraft septic system. The water soluble nature of wipes 108 may be used to provide improved trash management within aircraft lavatory 100.

Figure 2:
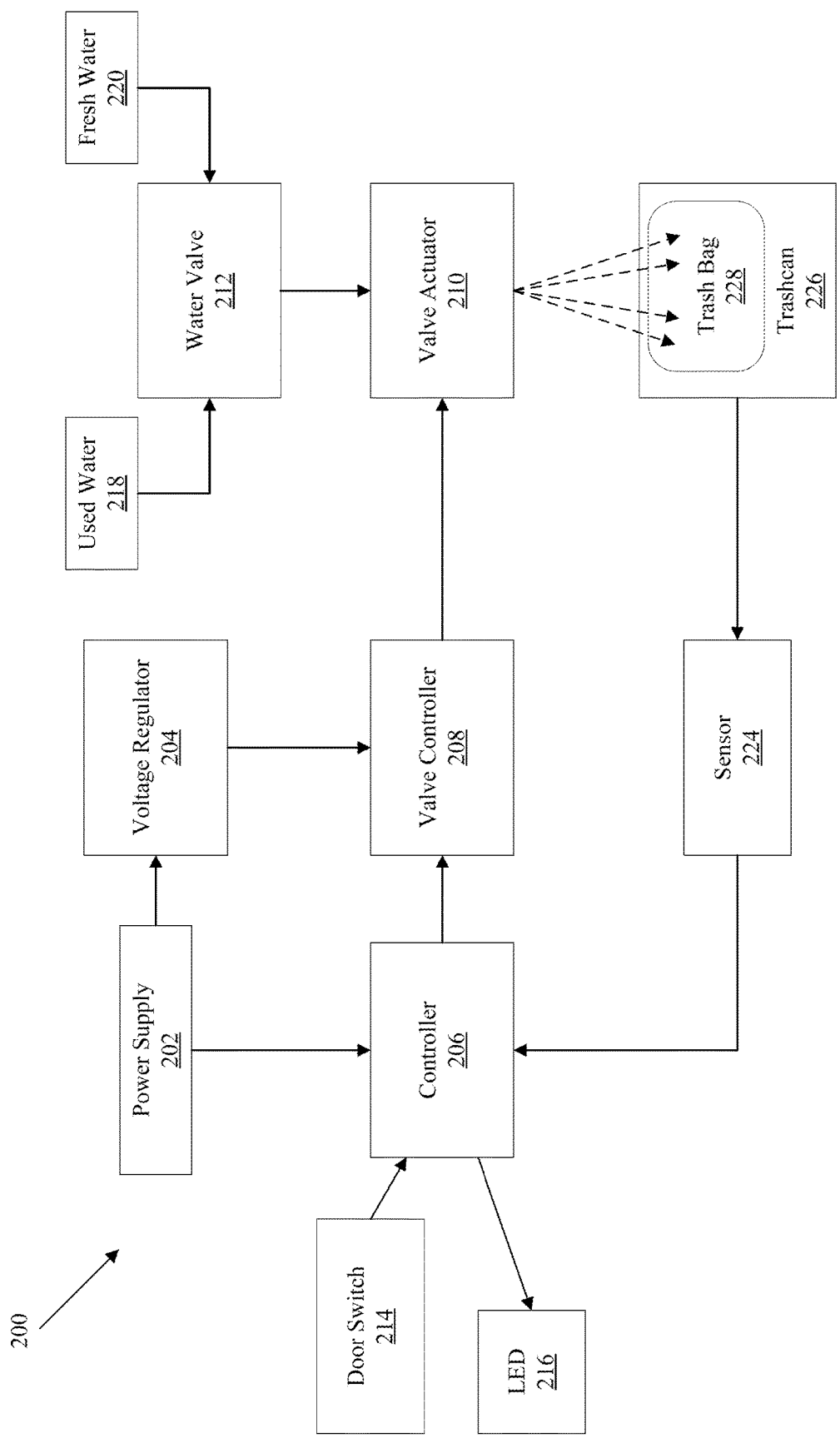
FIG. 2 illustrates an exemplary system architecture for a trash compactor for an aircraft lavatory, in accordance with various embodiments.

Referring to FIG. 2, in accordance with various embodiments, an exemplary trash compacter system architecture 200 for an aircraft lavatory is illustrated. Trash compactor 200 includes a power supply 202, a voltage regulator 204, a controller 206, a valve controller 208, a valve actuator 210, a water valve 212, a trash can 226, and a sensor 224. Trash can 226 may be an example of trash can 102. Trash can 226 includes a trash bag 228 for storing trash, such as wipes 108, for example.

Power supply 202 may be a 28 V DC power supply provided by the aircraft. In various embodiments, another power supply may be used, such as a 120 V or 240 V A/C power supply or another DC power supply. Power supply 202 is electrically connected to voltage regulator 204 and controller 206, providing the power that voltage regulator 204 and controller 206 use to operate.

Voltage regulator 204 is electrically connected to valve controller 208 and converts the power provided by power supply 202 to a voltage and current that is compatible with valve controller 208. Voltage regulator 204 provides the converted power to valve controller 208. Valve controller 208 is logically and/or electrically connected to both valve actuator 210 and controller 206. That is, valve controller 208 communicates with both valve actuator 210 and controller 206 either through wires, radio, or some other means. Valve controller 208 is configured to receive instructions from controller 206 and control valve actuator 210 based on the received instructions.

Valve actuator 210 is mechanically connected to water valve 212. Water flows from water valve 212 to trash bag 228 in response to valve actuator 210 activating. Valve actuator 210 may be a motor configured to control water valve 212, either open or closed. In various embodiments, valve actuator 210 may be a solenoid, a linear valve, or a rotary valve, among others. Valve actuator 210 is configured to spray water from water valve 212 into trash bag 228. Valve controller 208 may activate valve actuator 210 for about 1 second to about 30 seconds. In various embodiments, valve controller 208 may activate valve actuator 210 for about 5 seconds to about 20 seconds. In various embodiments, valve controller 208 may activate valve actuator 210 for about 10 seconds to about 15 seconds.

Figure 3B:
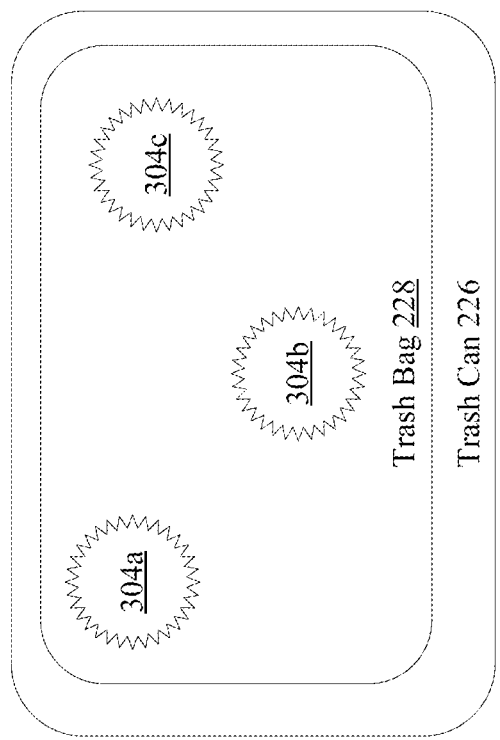
FIGS. 3A and 3B illustrate an exemplary trash compactors, in accordance with various embodiments.
Figure 3A:
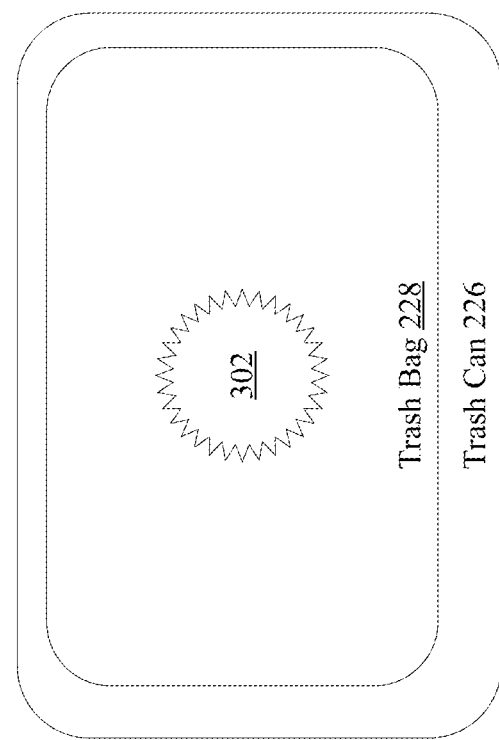

Water valve 212 if fluidly connected to used water source 218, fresh water source 220, and trash bag 228. In various embodiments, there may be tubes or pipes, either flexible or rigid, connecting used water source 218 to water valve 212 and fresh water source 220 to water valve 212. In various embodiments, water valve 212 may include a check valve to prevent backflow used water source 218 into fresh water source 220. Similarly, there may be tubes or pipes, either flexible or rigid, connecting water valve 212 to a watering device such as a nozzle, a head, a sprinkler, a spray bar and/or other device for spraying light, dispersed spray of water into trash bag 228. For example, as illustrated in FIG. 3A, a single watering device 302 is positioned over trash can 226 and trash bag 228. Watering device 302 receives water from water valve 212 and sprays the water into trash bag 228. In various embodiments, there may be more than one watering device (e.g., nozzle, head, tube, and/or other device) for spraying water into trash bag 228. For example, as illustrated in FIG. 3B, multiple watering devices 304a, 304b, and 304c are positioned above trash bag 228. Watering devices 304a, 304b, and 304c receive water from water valve 212 and spray the water into trash bag 228. Different configurations may be used for different size trash cans 226 and/or different water use patterns. For example, one or more watering devices may be mounted to a side of a cabinet that stores trash can 226. The one or more side mounted watering devices may spray water into trash bag 228 at an angle from the sidewall. In various embodiments, a stream of water may be used instead of a light, dispersed spray of water.

Water is sprayed into trash bag 228 by valve actuator 210 in response to a signal from valve controller 208. As mentioned, the spray may be a light, dispersed spray. In various embodiments, the spray may be stronger and heavier such that more water is sprayed into trash bag 228 over the same amount of time. In various embodiments, a stream of water may be used. Regardless of the manner in which the water is sprayed, the water soluble waste in the trash bag 228, such as for example wipes 108, absorb the water and break down, thereby utilizing less space in trash bag 228. In this way, trash in trash bag 228 is compacted. The presence of other, non-water soluble trash does not interfere with the compacting process. The water soluble trash (e.g., wipes 108) absorb the water, break down, and are pressed down by the weight of the trash above. Little to no water accumulates in trash bag 228 due to the small amounts of water used during each application and the absorption of water by the water soluble trash (e.g., wipes 108) over a period of time (e.g., the trash bag is full). In various embodiments, a total of about 100 ml to about 1 liter may be sprayed into trash bag 228 during the period of time. In various embodiments, a total of about 100 ml (3.38 oz) to about 500 ml (16.91 oz) may be sprayed into trash bag 228 over the period of time, and more specifically, about 200 ml (6.76 oz) to about 400 ml (13.53 oz), and more specifically about 250 ml (8.45 oz) to about 300 ml (10.14 oz) may be sprayed into trash bag 228 over the period of time.

The water used is controlled by water valve 212 which draws water from a fresh water source 220 or a used water source 218. Fresh water source 220 is the fresh water stored on the aircraft for use in the lavatory, such as for the sink. Used water source 218 may be a container that collects water from the sink in the lavatory for the purpose of using the water in the trash compactor system 200. Water valve 212 may select between the used water source 218 and the fresh water source 220. The selection may be made in response to a signal from controller 206. In various embodiments, the selection of used water source 218 may be made in response to a signal from the used water source 218 indicating the presence of the used water. In various embodiments, the selection of used water source 218 may be made in response to a signal from the fresh water source 220 indicating a predetermined water level is reached. In various embodiments, there is no used water source 218 and water valve 212 may be replaced with a direct connection between fresh water source 220 and valve actuator 210.

Sensor 224 is electrically and/or logically connected to controller 206 and trash can 226. That is, sensor 224 may be connected to controller 206 and/or trash can 226 by wires, radio, and/or other means of communication. Sensor 224 monitors the level of trash in trash bag 228. Sensor 224 provides an indication of the level of trash in trash bag 228 to controller 206. In various embodiments, sensor 224 provides a level indication at ¼ full, ½ full, ¾ full, and full. The fill level indicates the level of trash within trash bag 228 where full indicates that the trash has reached the top of trash bag 228 and may be overflowing out of trash can 226, such as through trash flap 104, for example. Sensor 224 may be an optical sensor located above trash bag 228 and pointed down toward a bottom of trash bag 228. The level indication may be provided by a distance between sensor 224 and the bottom of trash bag 228. In various embodiments, sensor 224 may comprise multiple optical sensors located in a side of trash can 226 that sense a change in light levels as trash bag 228 fills. In various embodiments, sensor 224 may be an acoustic sensor located above trash bag 228 and pointed down toward the bottom of trash bag 228. The level indication may be provided by a distance between sensor 224 and the bottom of trash bag 228. In various embodiments, sensor 224 a plate is located beneath trash can 226 that senses the weight of trash can 226. Sensor 224 provides the level indication based on the weight of the trash can. It is understood that there are other ways to determine the fill level of trash bag 228 that are within the scope of this disclosure.

Trash compactor system architecture 200 further includes a door switch 214 and an LED 216. Door switch 214 and LED 216 are logically and/or electrically connected to controller 206. In various embodiments, door switch 214 and LED 216 may be individually connected to controller 206 by wires, radio, and/or other means of communication. Door switch 214 provides an indication of the occupancy status of the lavatory. In various embodiments, door switch 214 is the door switch that is generally used to provide an indication of occupancy to the passengers. LED 216 provides a fill status of the trash can 226. In various embodiments, LED 216 is a first color (e.g., green) when a trash bag 228 is present in trash can 226 and trash bag 228 is not full. In various embodiments, LED 216 is a second color that is different than the first color (e.g., red) when either trash bag 228 is not present in trash can 226 or trash bag 228 is full and needs to be changed. Providing an indication of when trash bag 228 is ready to be changed reduces the workload of crew members and improves the experience of the passengers as trash is less likely to overflow out trash can 226. In various embodiments, LED 216 is a single LED. In various embodiments, LED 216 is a sign providing an indication of the status of trash can 226.

Controller 206 receives inputs and determines when to activate valve actuator 210 based on the received inputs. Controller 206 is powered by power supply 202 and receives inputs from door switch 214 and sensor 224. Controller 206 may receive the occupancy status of the lavatory from door switch 214. The status provided may be occupied, not occupied, or unknown. The occupancy status of the lavatory may be taken into consideration when determining when to activate valve actuator 210. This may be considered in order to avoid startling a passenger in the lavatory when activating valve actuator 210. In various embodiments, valve controller 208 may deactivate valve actuator 210 in response to the trash can opening, such as trash flap 104 opening. In various embodiments, the trash can lid (e.g., trash flap 104) may be locked while valve actuator 210 is active. In various embodiments, the occupancy status may not be considered as the valve actuator 210 is active for a short duration of time, as noted above.

Controller 206 sends instructions to valve controller 208 to activate valve actuator 210. In various embodiments, valve controller 208 is removed and controller 206 directly controls valve actuator 210. Controller 206 determines when to activate valve actuator 210 and for how long. Controller 206 determines when to activate valve actuator 210 based on inputs from sensor 224 and door switch 214. Controller 206 may determine how long to activate valve actuator 210 based how quickly trash bag 228 fills. For example, controller 206 may determine to activate valve actuator 210 for about 1 to about 3 seconds in response to the time between activation being above a first threshold. That is, trash bag 228 is filling slowly. As another example, controller 206 may determine to activate valve actuator 210 for about 3 to about 5 seconds in response to the time between activations being below a second threshold. That is, trash bag 228 is filling quickly and may benefit from more frequent water application. In various embodiments, the duration of time that valve actuator 210 is activated may be a fixed time.

Valve controller 208 and controller 206 may each comprise one or more processors configured to implement various logical operations in response to execution of instructions, for example, instructions stored on a non-transitory, tangible, computer-readable medium. The one or more processors can be a general purpose processor, a microprocessor, a microcontroller, a digital signal processor (DSP), an application specific integrated circuit (ASIC), a field programmable gate array (FPGA) or other programmable logic device, discrete or transistor logic, discrete hardware components, or any combination thereof.

Controller 206 may further comprise memory to store data, executable instructions, system program instructions, and/or controller instructions to implement the control logic of controller 206.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se.

Figure 4:
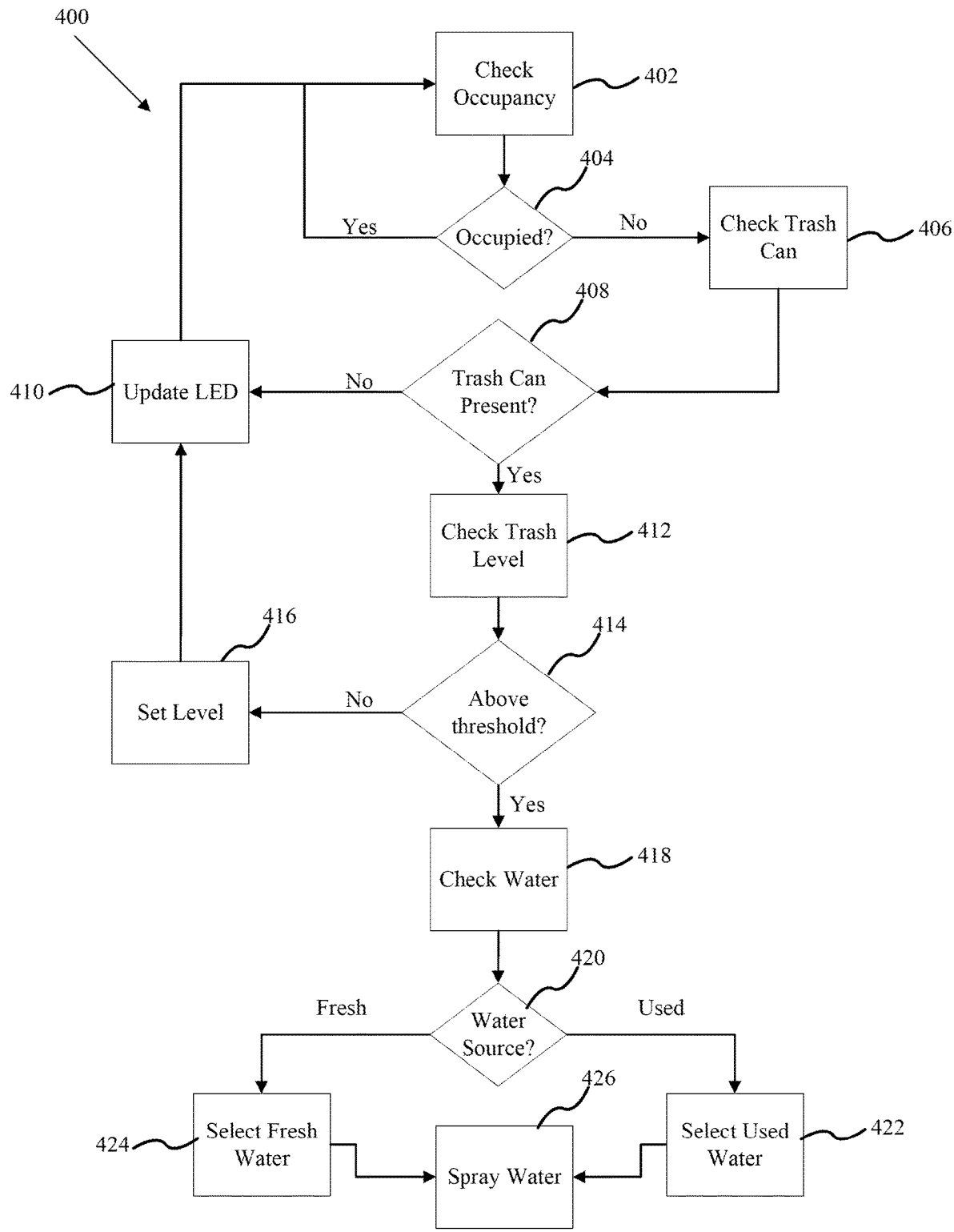
FIG. 4 illustrates an exemplary flow diagram for controlling a trash compactor, in accordance with various embodiments.

Referring now to FIG. 4, in accordance with various embodiments, a method 400 for controlling an aircraft lavatory trash compactor for a trash can is illustrated. In various embodiments, method 400 is performed by a microcontroller. In various embodiments, method 400 may be performed by controller 206 described above with respect to FIG. 2.

At block 402, controller 206 checks the occupancy status of the lavatory at regular intervals. Occupancy status may be provided by a door sensor, such as door switch 214, for example. In various embodiments, controller 206 may determine the occupancy status based at least in part on the door sensor. For example, controller 206 may further receive inputs from a light, a motion sensor, or other indication of occupancy. In various embodiments, the intervals may be about 1 minute to about 10 minutes. In various embodiments, the interval may be about 3 minutes to about 5 minutes.

At decision block 404, if it is determined that the lavatory is occupied, the method 400 returns to block 402. If, instead, it is determined that the lavatory is not occupied, the method 400 proceeds to block 406.

At block 406, controller 206 determines whether a trash can is present in the lavatory. In various embodiments, controller 206 determines whether a trash bag is present in the trash can. In various embodiments, a sensor may provide an indication of whether a trash bag is present in the trash can. In various embodiments, the sensor may be a switch, a light sensor, an acoustic sensor, among others.

At decision block 408, if it is determined that the trash can is not present, the method 400 proceeds to block 410.

At block 410, controller 206 updates an LED. In various embodiments, controller 206 updates the LED to indicate that the trash bag needs to be changed. In various embodiments, the LED is a sign indicating that that trash bag needs to be changed. In various embodiments, the LED sign provides additional information such as whether the trash bag is full or if there is an error, such as a missing trash can or trash bag. In various embodiments, controller 206 updates the LED to indicate the fill status of the trash can.

Returning, to decision block 408, if, instead, it is determined that the trash can is present, the method 400 proceeds to block 412.

At block 412, controller 206 determines the current trash level in the trash can. In various embodiments, controller 206 polls a sensor to receive a trash level within the trash can. In various embodiments, the sensor sends periodic updates of the trash level to controller 206. Controller 206 then determines whether the trash level is above a predefined threshold. In various embodiments, there may be multiple thresholds such as, for example, ¼ full, ½ full, and ¾ full. In various embodiments, there may be additional threshold such as, for example, ⅓ full and ⅔ full.

At decision block 414, if it is determined that the trash level is not above a threshold, then the method 400 proceeds to block 416.

At block 416, controller 206 sets the trash level and proceeds to block 410 to update the LED with the current trash level.

Returning to decision block 414, if, instead, it is determined that the trash level is above a threshold, the method 400 proceeds to block 418.

At block 418, controller 206 determines which water source to use. In various embodiments, there is a fresh water source and a used water source to use. Controller 206 may determine to use the fresh water source based on the used water source being empty. Controller 206 may determine to use the used water source based on the fresh water source being empty. Controller 206 may determine to use the used water source based on the fresh water source being below a threshold, such as, for example ¼ full. As discussed above, different means of measure the status of trash bag 228 may be used. In various embodiments, a downward facing optical sensor may be placed above trash bag 228 to measure a distance between the contents of trash bag 228 and sensor 224. The distance between the contents of trash bag 228 and sensor 224 may be used to determine how full trash bag 228 is. In various embodiments, an acoustical sensor may be used in a similar manner.

At decision block 420, if it is determined to use the used water source, the method 400 proceeds to block 422.

At block 422, controller 206 selects the used water source. In various embodiments, controller 206 may activate a valve to select the used water source. The method 400 then proceeds to block 426.

Returning to decision block 420, if, instead, it is determined to use the fresh water source, the method 400 proceeds to block 424.

At block 424, controller 206 selects the fresh water source. In various embodiments, controller 206 may activate a valve to select the fresh water source.

At block 426, controller 206 sprays water into the trash can. In various embodiments, controller 206 may signal a motor, an actuator, a solenoid, or other such device to release water into the trash can.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Numbers, percentages, or other values stated herein are intended to include that value, and also other values that are about or approximately equal to the stated value, as would be appreciated by one of ordinary skill in the art encompassed by various embodiments of the present disclosure. A stated value should therefore be interpreted broadly enough to encompass values that are at least close enough to the stated value to perform a desired function or achieve a desired result. The stated values include at least the variation to be expected in a suitable industrial process, and may include values that are within 10%, within 5%, within 1%, within 0.1%, or within 0.01% of a stated value. Additionally, the terms "substantially," "about" or "approximately" as used herein represent an amount close to the stated amount that still performs a desired function or achieves a desired result. For example, the term "substantially," "about" or "approximately" may refer to an amount that is within 10% of, within 5% of, within 1% of, within 0.1% of, and within 0.01% of a stated amount or value.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An aircraft lavatory trash compactor, comprising:
   a water source;
   a valve actuator connected to the water source;
   a trash can disposed below the valve actuator;
   a door switch configured to provide an indication of occupancy of an aircraft lavatory to passengers; and
   a controller connected to the door switch, wherein the controller is configured to receive inputs from the door switch to determine an occupancy of the aircraft lavatory, activate the valve actuator to spray water into the trash can, and to deactivate the valve actuator in response to the aircraft lavatory being occupied.

2. The aircraft lavatory trash compactor of claim 1, wherein the controller activates the valve actuator to be open for a period of time.

3. The aircraft lavatory trash compactor of claim 1, further comprising:
   a sensor configured to read a level of trash in the trash can; and
   a display to indicate the level of trash in the trash can.

4. The aircraft lavatory trash compactor of claim 3, wherein the controller is further configured to determine the level of trash in the trash can based on the sensor and update the display based on the determined level of trash.

5. The aircraft lavatory trash compactor of claim 4, wherein the controller is further configured to activate the valve actuator in response to the level of trash in the trash can exceeding a threshold.

6. The aircraft lavatory trash compactor of claim 1, wherein the water source comprises:
   a fresh water source;
   a used water source; and
   a water valve connected to the fresh water source, the used water source, and the valve actuator, the water valve including a check valve to prevent backflow of the used water source into the fresh water source.

7. The aircraft lavatory trash compactor of claim 1, further comprising:
   a valve controller configured to receive an instruction from the controller and activate the valve actuator in response to receiving the instruction.

8. The aircraft lavatory trash compactor of claim 1, further comprising:
   a power supply configured to power the controller and the valve actuator.

* * * * *